Jan. 16, 1951 V. C. PATTERSON 2,538,734

AUTOMATIC FREEZING APPARATUS

Filed March 25, 1946 8 Sheets-Sheet 1

INVENTOR.
Velt C. Patterson

BY [signature]

Attorneys

Jan. 16, 1951 V. C. PATTERSON 2,538,734

AUTOMATIC FREEZING APPARATUS

Filed March 25, 1946 8 Sheets-Sheet 2

INVENTOR.
Velt C. Patterson
BY [signature]
Attorneys

Jan. 16, 1951 V. C. PATTERSON 2,538,734

AUTOMATIC FREEZING APPARATUS

Filed March 25, 1946 8 Sheets-Sheet 3

INVENTOR.
Velt C. Patterson

BY Dodge & Sons

Attorneys

Jan. 16, 1951 V. C. PATTERSON 2,538,734

AUTOMATIC FREEZING APPARATUS

Filed March 25, 1946 8 Sheets-Sheet 4

INVENTOR.
Velt C. Patterson

BY Dodge [signature]

Attorneys

Jan. 16, 1951 V. C. PATTERSON 2,538,734

AUTOMATIC FREEZING APPARATUS

Filed March 25, 1946 8 Sheets-Sheet 5

INVENTOR.
Velt C. Patterson

BY Dodge & Sons

Attorneys

INVENTOR.
Velt C. Patterson
BY
Dodge and Sons
Attorneys

INVENTOR.
Velt C. Patterson
BY Dodge [signature]
Attorneys

AUTOMATIC FREEZING APPARATUS

Filed March 25, 1946

8 Sheets-Sheet 8

INVENTOR.
Velt C. Patterson
BY Dodge and Sons
Attorneys

Patented Jan. 16, 1951

2,538,734

UNITED STATES PATENT OFFICE 2,538,734

AUTOMATIC FREEZING APPARATUS

Velt C. Patterson, York, Pa., assignor to York Corporation, York, Pa., a corporation of Delaware Application March 25, 1946, Serial No. 657,001

14 Claims. (Cl. 62—102)

This invention relates to machines for freezing food products such as vegetables, fish and meat, either in bulk or in packages, as occasion may require.

Freezing is effected by circulating refrigerated gas (air) in contact with the food products when freezing in bulk, and in contact with confining heat transfer surfaces used to preserve package form when freezing in packages.

The articles to be frozen are handled in trays which are inserted at the bottom and removed from the top of an intermittently rising stack. The trays rest upon one another and are moved upward by a reciprocating lift which acts upon the lowermost tray in the stack and pushes the stack up until the bottom tray latches in an elevated position. Then the lift retreats to admit the next tray. The trays themselves form transverse air ducts, each duct being above material in one tray and below material in the next.

From this arrangement flow many advantages. The height of the stack can be laid out to suit any particular installation without basic change of design of any component except the tray guiding columns, and related structure. These are changed as to height only.

There are no moving parts in the path of the refrigerated air except the circulating fan, the refrigerative surface, and the trays. Thus frost accumulation and the hardening of lubricants do not impair the operation of the device.

Food products touch nothing except the interiors of the trays. It is simple to remove trays for cleaning even while the operating cycle of the machine is progressing.

The machine will handle trays of different depths, suited to different bulk products. More important, however, is the possibility of substituting for the bulk trays special trays for packaged products, such trays being dimensioned to receive packages of given thickness and hold them against the distortion which otherwise might be caused by swelling during freezing. A filler piece used with such trays will adapt them to freeze packages of some particular thickness less than that for which the tray was designed.

The bulk trays may also be used to freeze packaged articles.

Each feeding cycle of the machine is initiated by a clock actuated electric switch of known form. The frequency of recurrence may thus be determined by the switch closing mechanism of the clock, and this, without more, determines the time of treatment of each tray-full.

A vertical stack machine occupies the minimum practicable floor space, and since the tower is open from top to bottom assures that any spillage will collect at the bottom, out of the path of the trays, and under conditions permitting easy removal. This last offers advantages as to sanitation more important than is commonly realized.

The machine is completely automatic and so can be operated with the minimum practicable labor and supervision. The clock merely times the cycle. Relay switches thereafter time successive phases of the cycle, and are electrically interlocked, so that one phase must be completed before the next can be started.

The design of the machine imposes no limitations on the type of refrigerative unit used to cool the air and none on the number of air passes in heat exchanging relation with material being frozen. A simple cooler and a simple two-pass circuit are normally sufficient, and have been selected for explanatory purposes but by way of example only.

The present application is a substitute for, and in part a continuation of application Serial Number 566,313, filed December 2, 1944. This application has been abandoned in favor of the present continuing application.

The changes from the structure of the earlier application involve the substitution of hydraulic piston motors for the electrical motors previously adopted. The change greatly simplifies the controls, assures the development of maximum force by the motors from the very start of each conveying cycle, makes it easier to fix the range of each conveying motion, and facilitates the reversal of the dump-actuating motor. Since the lift originally proposed is hydraulic, the adoption of hydraulic motors for other power functions is conveniently effected and simplifies servicing. Servicing is peculiarly important since these units are operated in rural districts where produce is grown.

Other modifications have to do with overcoming difficulties likely to be caused by freeze-ups when the machine is stopped while loaded and under refrigeration, as it commonly must be at night, and from time to time during the day.

The preferred commercial embodiment of the invention will now be described by reference to the accompanying drawings in which.

Tray received; ready to dump
Start of dumping fall
Dumping impact
Start of return
Tray discharge position.

Figures 15, 16:
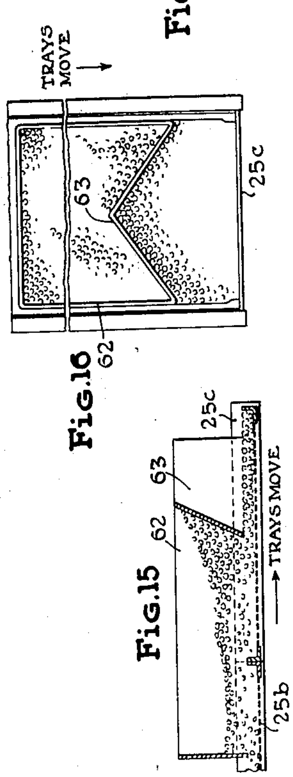

Fig. 15 is a longitudinal section of the charging box and plow.

Fig. 16 is a plan of the charging box and plow.

Figures 2, 17, 18:
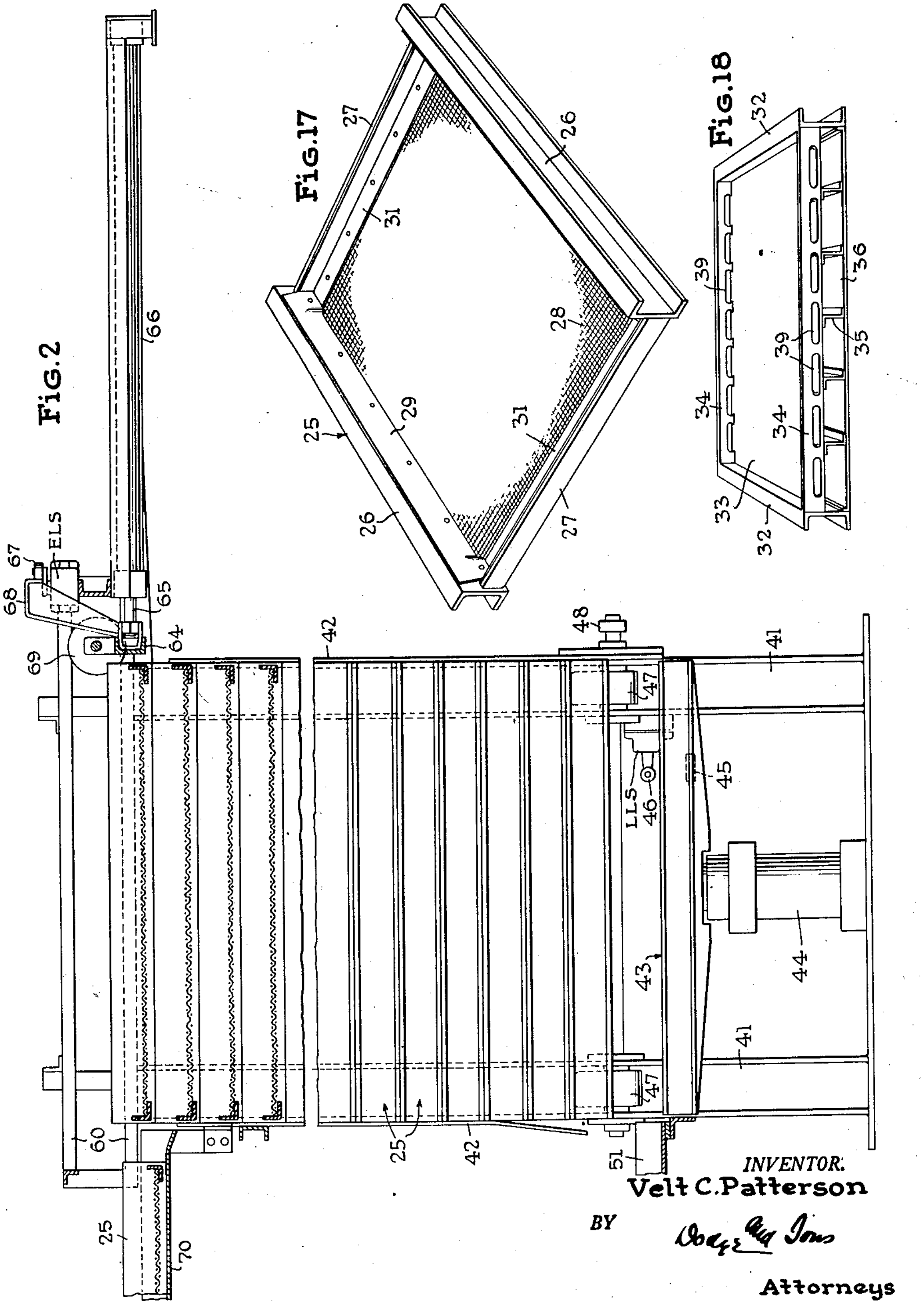
Fig. 2 is an elevation of the processing tower and tray ejecting mechanism, with a portion of the tower shown in vertical section. The view is drawn on a larger scale than Fig. 1 and a portion of the tower is broken away.

Fig. 17 is a perspective view of the tray used when freezing in bulk.

Fig. 18 is a perspective view of a different type of tray used when freezing in packages.

Figure 19:
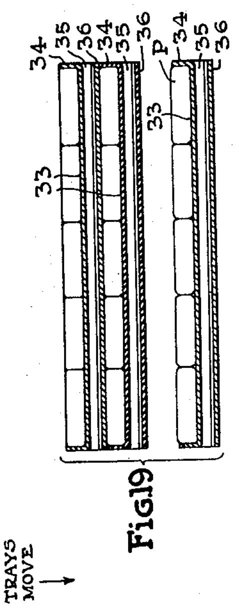

Fig. 19 shows the trays of Fig. 18 stacked, with packages confined thereby.

Figures 1, 20, 21:
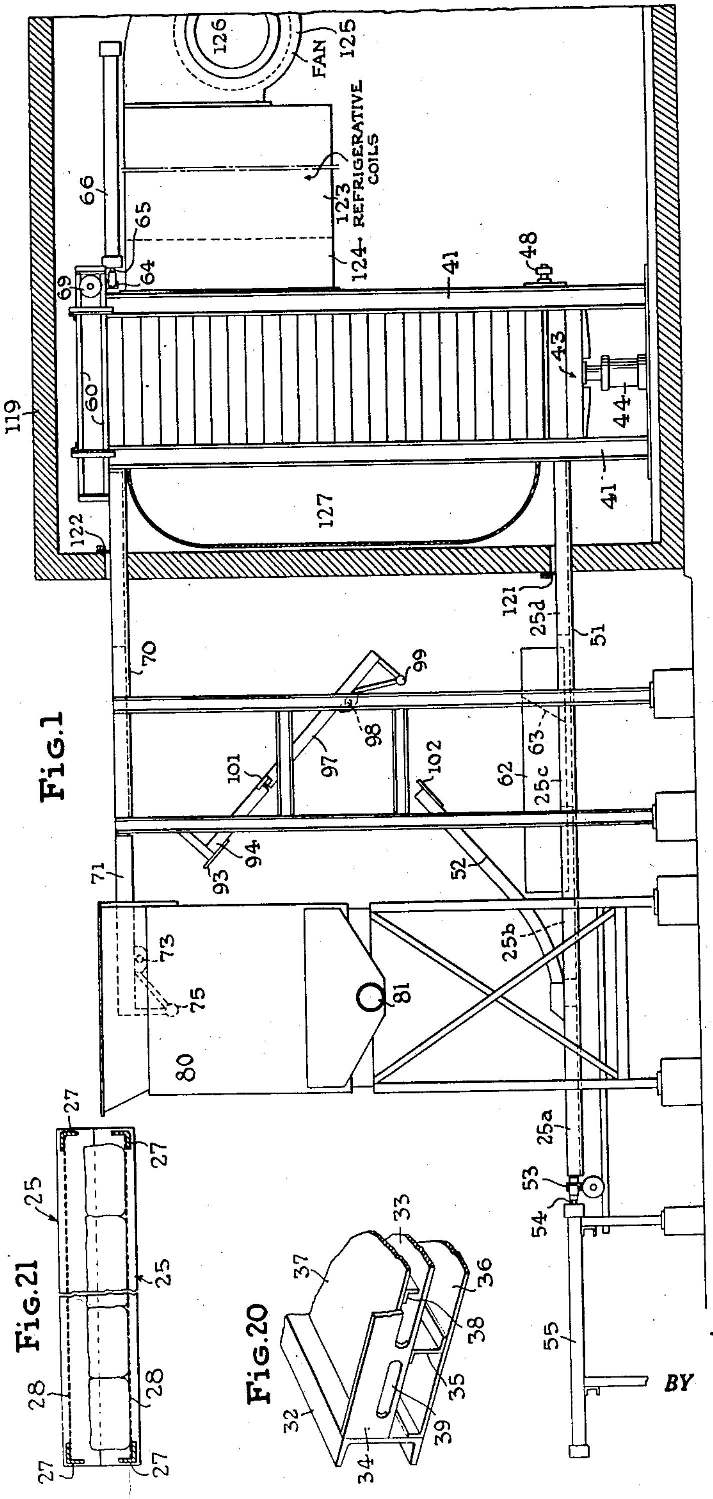
Fig. 1 is a view, part in elevation and part in vertical section showing the cooling mechanism, the charging and discharging conveyors and the tray loading and dumping mechanisms in relation to the processing tower.

Fig. 20 is a fragmentary perspective illustrating the use of a false bottom or filler plate with the tray of Fig. 18.

Fig. 21 shows how large objects or packages may be frozen, using the trays of Fig. 17 with alternate trays inverted.

Figure 22:
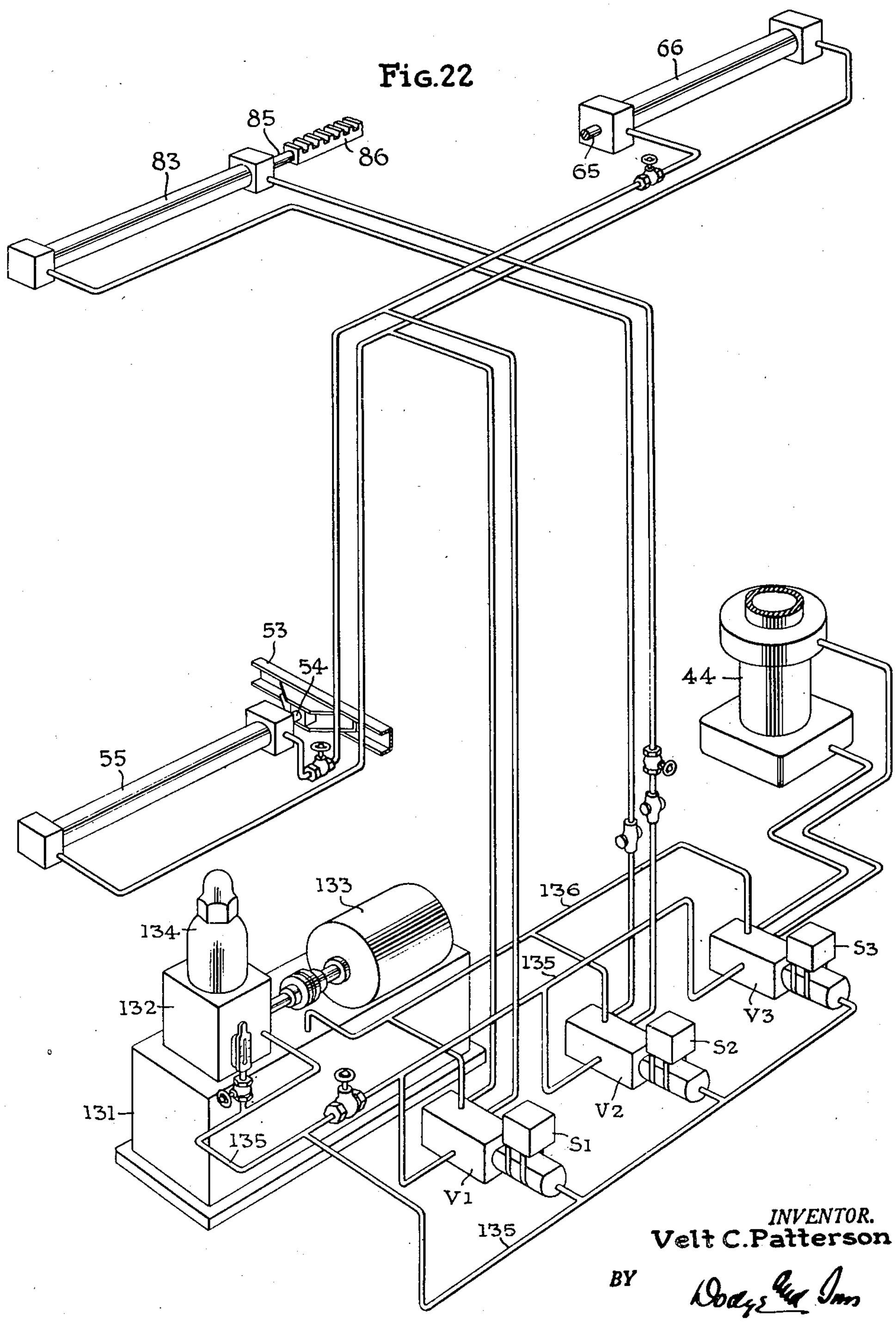

Fig. 22 is a diagram of the hydraulic system drawn in perspective.

Figure 23:
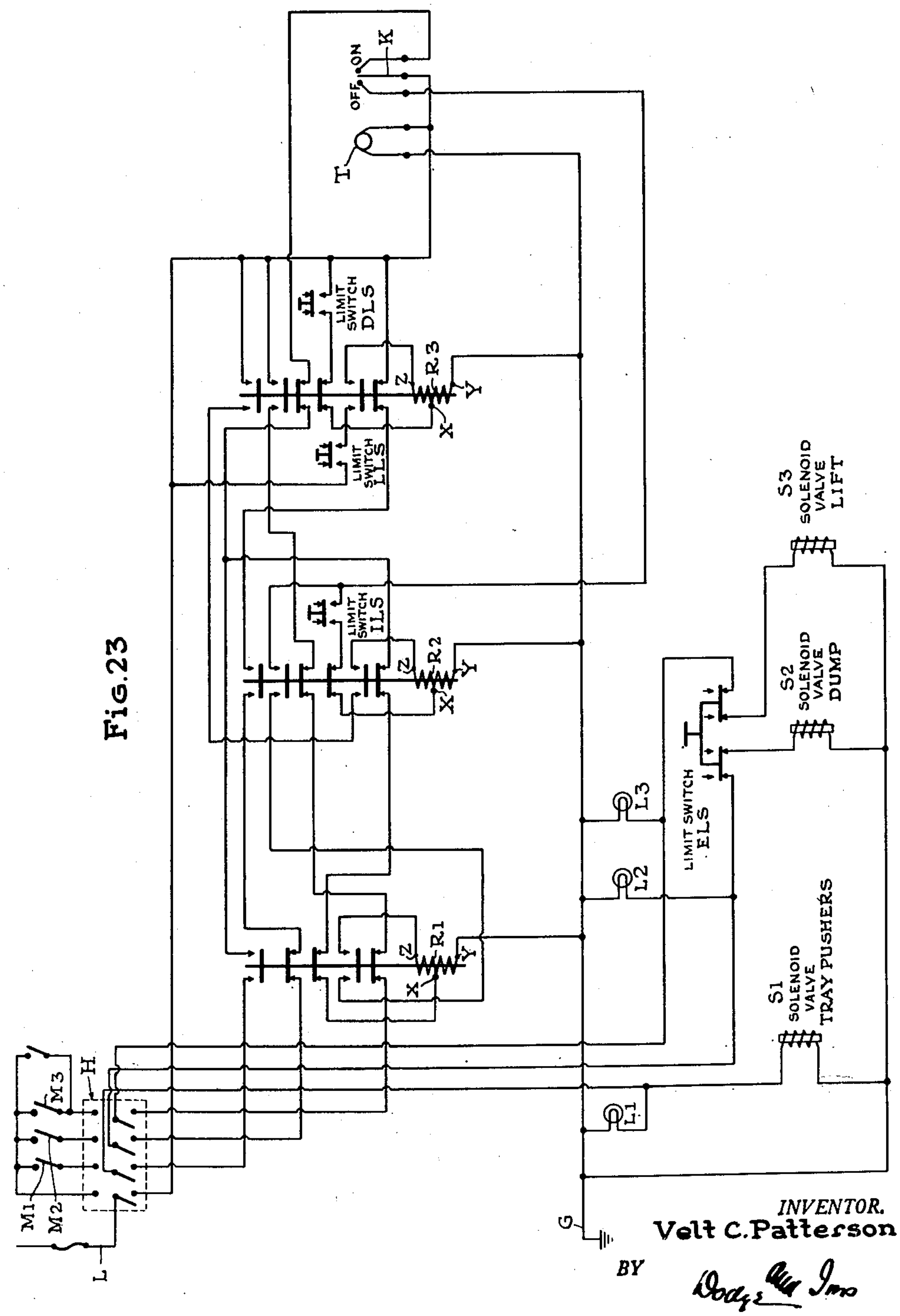

Fig. 23 is a wiring diagram of the electric control circuits.

The material to be frozen is passed through the tower in trays. If the material is to be frozen in bulk, trays such as that illustrated in Fig. 17 are used, whereas packaged goods (while they can be frozen in trays of the type shown in Fig. 17) are preferably frozen in trays of the special types shown in Figs. 18, 19 and 20. The construction of the trays for packaged goods is not claimed herein but forms the subject matter of my divisional application Serial No. 22,427 filed April 21, 1948, which issued on November 8, 1949, as Patent No. 2,487,584.

The bulk trays generally indicated by the numeral 25 have channel bar sides 26 and angle bar ends 27 arranged as shown. The channels and angles are of ordinary steel and are welded together. The bottom 28 of the tray is preferably of non-corrosive alloy screen material, but may be of galvanized material where cost must be minimized. Similar considerations apply to the aprons 29 and angle strips 31 which preferably are of non-corrosive alloy material. Thus all surfaces with which foodstuffs come in contact are non-corrosive and can be kept clean. A non-corrosive chrome-nickel steel is considered an ideal material from the standpoint of sanitation and mechanical strength.

The trays of Fig. 17 have sides 26 which are symmetrical with reference to their horizontal center line, so that the top and bottom flanges are identical. This permits alternate trays to be inverted to allow the freezing of large objects such as poultry, as will be explained in detail hereinafter.

The bottoms of the angle bars 27 are slightly above the bottoms of the channels 26 (see Fig. 3) and the angle bar ends are only about half the height of the sides. Hence, when the trays are filled to the level of the tops of the ends 27, a stack of such trays will afford air passages which extend lengthwise of the trays above the material in that tray and below the material in the tray next above. Air at sub-freezing temperature is circulated through these passages.

While packages can be laid in such trays and their contents can be satisfactorily frozen, there is a tendency for the goods to swell and distort the packages. This complicates the packing problem, and consequently for freezing in packages it is desirable to use trays such as illustrated in Figs. 18—20. These trays resist swelling and warping.

Such a tray has channel bar sides 32 and a plate bottom 33 bent up to form ends 34. The bottom 33 is at about mid-height of the sides 32 and is spaced by Z-bar stays 35 from a false bottom 36. All parts are welded together. The packages to be frozen are laid on the bottom 33 and the passages between bottom 33 and false bottom 36 are for the passage of air. The Z-bars 35 assist in producing a rigid structure.

As indicated in Fig. 19, the packages P should be so dimensioned as to approximate in thickness the depth from the top of side 32 to the top of bottom plate 33. They can desirably be slightly more, or a little less, in which event they are permitted a slight swell before contact is established with the false bottom 36 of the superposed tray. Waxed paper packages such as are customary in the frozen food industry can be frozen without sticking to a contacting false bottom 36. Hence, an overlying tray can safely be slid off after the freezing operation. This fact is important because actual contact improves the heat transfer and can be had without imposing unreasonably close limits on package depth.

The essential thing is that when the package starts to swell it will be restrained sufficiently to assure a rectangular package which will pack satisfactorily in cartons.

With the preferred dimensions, when package filled trays are stacked, as indicated in the upper portion of Fig. 19, the false bottom rests on and compresses slightly the layer of packages P supported by the next lower tray.

To permit the use of the same set of trays to freeze thinner packages the arrangement shown in Fig. 20 may be used. This comprises a removable filler plate 37 with longitudinal ribs 38 on its lower face to space the plate above bottom plate 33. Ports 39 in ends 34 are then desirable to permit refrigerated air to flow between bottom 33 and the filler plate 37.

The same machine will handle the tray of Fig. 17 in either of two ways and will handle the tray of Figs. 18–20 either with or without filler plates. When freezing goods in packages the trays are filled and emptied by hand, and the dumping and bulk-charging mechanisms are put out of action. This is done by removing the charging box and readjusting the finger which actuates the dump limit switch DLS.

To develop the operation of all components of the machine, the description will now proceed on the basis of bulk freezing using the trays of Fig. 17. Since the trays are fed to, through and from the tower in the same way, regardless of the type of tray, such a description will cover all significant functions of the machine. After this description has been completed special manipulations of which it is susceptible will be elaborated.

Figure 3:
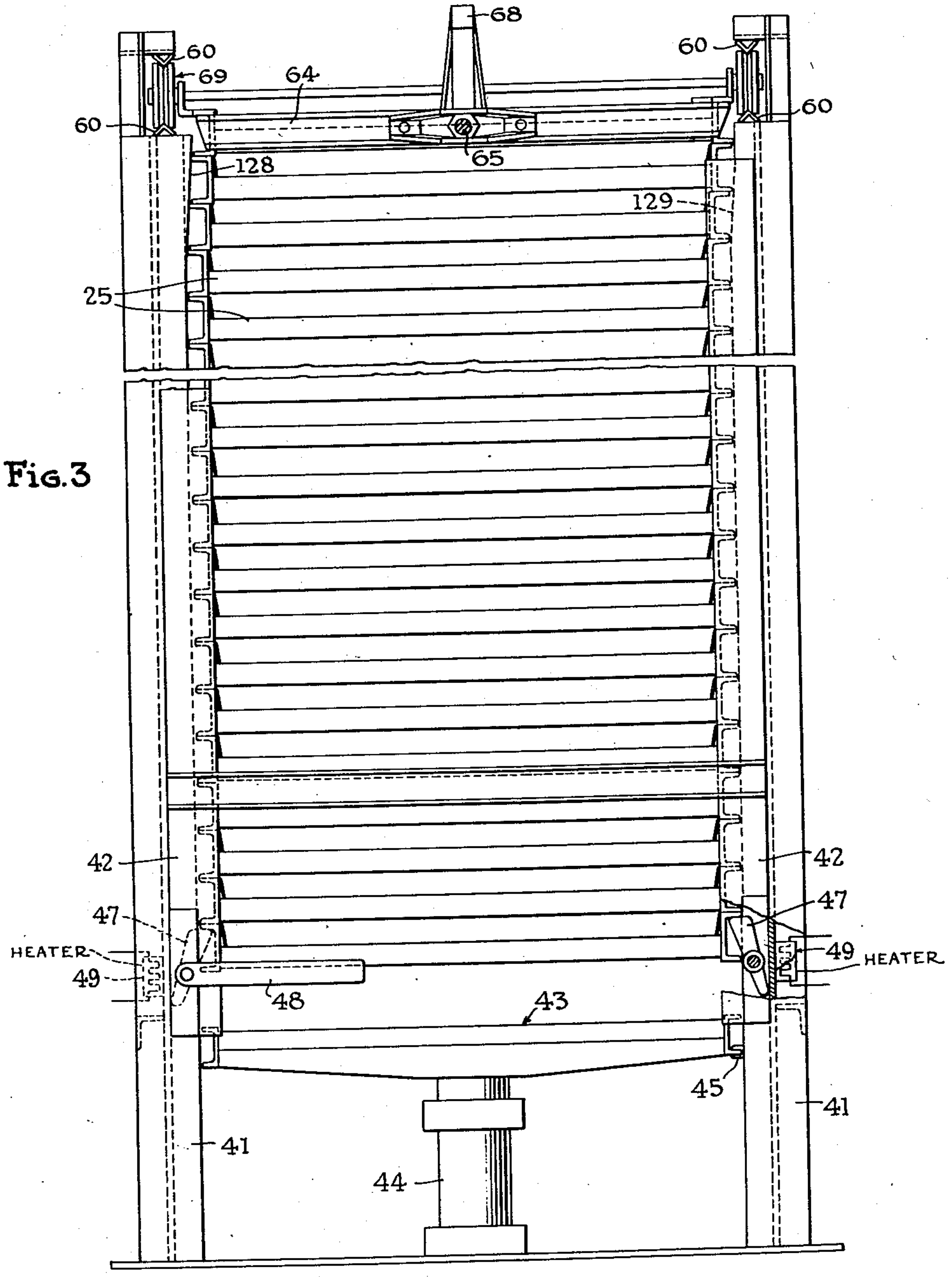
Fig. 3 is a view on the same scale as Fig. 2 showing the tower in elevation and looking to the left relative to Fig. 2. Portions are broken away to reduce the height of the view and to show a latch more clearly.

The tower proper comprises four H-section columns 41 spaced to receive trays 25 in a stack between them and to guide the trays in their upturned motion (see Figs. 2 and 3). Attached to columns 41 are guide flanges 42, which start above the level at which trays are inserted and end below the level at which the trays are discharged. These guide flanges perform a secondary useful function in that they blind the ends of the channel irons 26 which form the sides of the trays 25 and thus prevent bypassing of the flowing air. At the base of the tower is a vertically guided lift platform 43 which is actuated by a double acting hydraulic lift motor 44.

The hydraulic unit which supplies pressure fluid to the lift and to the conveyor motors, and the electrical control system which times all the events in the cycle, will be decreased after mechanical components have been set forth.

The lifting action of motor 44 is terminated by the closing of the lift limit switch LLS and this switch is closed when a lug 45 on the platform 43 strikes the arm 46 of the switch and moves it upward far enough to close the switch. The lifting action is terminated shortly after four ratchet latches 47 move in to engage the upper flange of the tray lifted by the platform 43. The latches 47 are pivoted to the columns 41 and are biased in an engaging direction by the weighted arms 48. Small electric resistance heaters 49 are located near to the pivots on which the latches 47 are mounted and are continuously operated so that the latch pivots are kept always above freezing temperature. The purpose is to assure free action of the latches since failure of a latch to engage could entail serious operative difficulties.

Figures 4, 5:
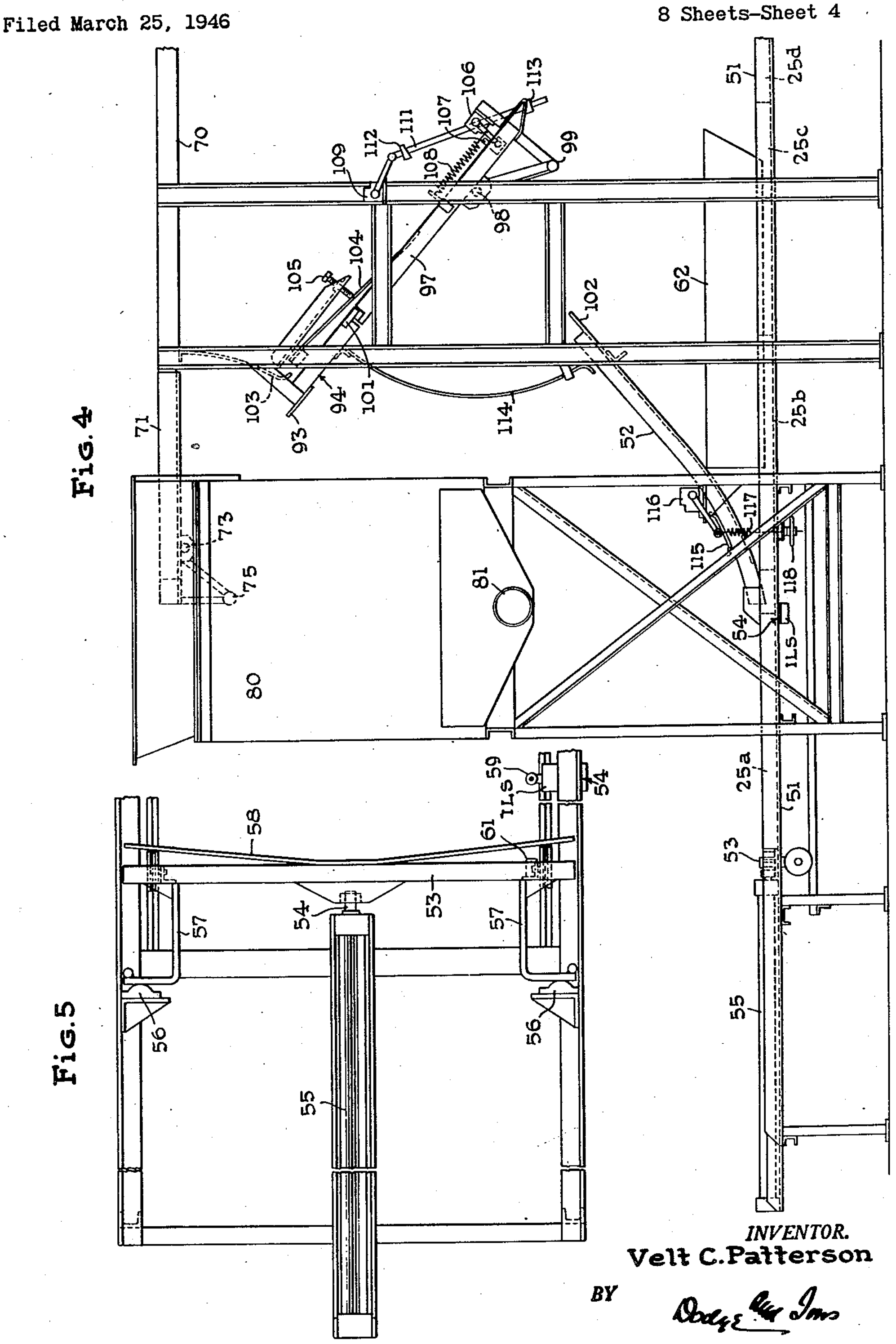
Fig. 4 is a view similar to a portion of Fig. 1, but drawn on a larger scale permitting illustration of details such as tray buffers and tray brakes omitted from Fig. 1 because of the relatively small scale of that figure.
Fig. 5 is a plan view of the tray injecting mechanism drawn on a larger scale than Fig. 4.

The trays 25 are guided onto the lift platform 43 by a guiding track 51 shown in Figs. 1, 2 and 4 when the platform is in its lowest portion.

The length of the track 51 as illustrated in Figs. 1 and 4 is somewhat more than sufficient to receive four trays 25 in line. Empty trays immediately after each has been dumped slide onto the track 51 from an inclined curved chute 52. This chute terminates at a distance above the track 51 sufficient to permit a tray, which has slid from the chute, to be pushed back under the discharge end of the chute. In Fig. 4 a tray which has just slid off the end of the chute is indicated at **25*a***.

After it has been deposited on the track 51 it is forced to the right by a yoke 53 which is connected to the piston rod 54 of a double acting tray pusher cylinder motor 55. If desired the yoke may be guided by a wheeled carriage, as shown. The retracted position of the yoke 53 is determined by rubber bumpers 56 which are engaged by bumper arms 57 mounted on the yoke 53. A bow spring member 58 is carried by the yoke 53 to absorb the shock of collision in the event that a tray slides off the chute 52 at undue speed.

The motor 55 is an ordinary double acting expansible chamber motor. It meets substantial resistance only on the outward stroke of the piston rod 54. By making the piston rod 54 of relatively large size it is possible to secure a differential piston effect so that the tray pusher motor develops an adequate force on its outward stroke and a smaller force on its return stroke. This affords economy in the use of hydraulic fluid.

The tray **25*a* just mentioned is not forced directly onto the platform 43 but pushes ahead of it a series of trays designated in Figs. 1 and 4, 25*b*, 25*c*, 25*d*, the last named tray being just ready to be forced onto the lift platform 43. The stroke of the piston rod 54 is mechanically so limited that it moves the series until the lead tray is squarely on the lift platform and then stops. It is important, however, to make sure that the leading tray is pushed all the way onto the platform 43 before any other event in the cycle of the machine can commence. For this purpose the injector limit switch designated ILS is located on the track 51 at the point indicated at 54. The actuating arm 59 of the switch ILS is moved to close the switch by means of a lug 61 on the yoke 53**. The switch ILS does not terminate the forward movement of the motor but it prevents the control sequence from proceeding further in the event that the motor fails to reach the proper final position and close the switch.

In Figs. 4, 15 and 16 the tray **25*b* is shown entering beneath, and the tray 25*c* is shown leaving, the charging box 62 which overlies the track 51 and has the leveling plow 63 at its exit end. The box is removable with the plow. Material to be frozen in bulk, for example a stream of shelled green peas, is fed to the charging box 62. The peas are leveled off by the plow 63 to a depth approximating the height of the ends 27 of the trays 25** (see Fig. 15). In this way the trays are precisely loaded and spillage is avoided.

The leading tray on track 51, designated as **25*d* in Fig. 4, is moved onto the platform 43**. Thereafter the platform rises carrying the inserted tray into contact with the bottom of the stack of trays and then upward with the entire stack until the latches engage the upper flange of this newly inserted tray. Shortly after this occurs the lift limit switch LLS will be closed causing the platform to descend, and assume its lower position, to receive the next tray.

The limit switches ILS and LLS are each spring biased so that ILS reopens when yoke 53 retreats and LLS reopens when the platform 43 descends.

At the time a tray is fed to the platform 43 the top tray of the stack is forced off the stack by yoke 64 attached to the piston rod 65 of ejector motor cylinder 66. This second tray pusher cylinder is similar to the injector cylinder 55 and develops a much greater force on the outstroke than on the return stroke of the piston rod 65. This economizes in the use of hydraulic fluid on the idle return stroke. The yoke 64 is guided by a wheeled carriage 69 which runs between top and bottom guides 60 so as to be held positively in alinement. See Figs. 1 and 2.

It is important to make sure that the piston rod 56 is completely retracted before the lift 44 can be actuated. This is accomplished by the ejector limit switch ELS whose arm 67 is spring biased in a switch opening direction and is moved to circuit closing position by a lug 68 mounted on the yoke 64. It controls two circuits, one of which controls the tray dump and the other of which controls the lift. The switch ELS opens as soon as the piston rod 65 starts outward and does not close until the piston rod has again been completely retracted. Until the switch ELS has been reclosed the succeeding event in the cycle of the machine cannot commence. Under manual control condition it prevents operation of the dump and operation of the lift except when the tray pushers are retracted.

Figures 6, 7:
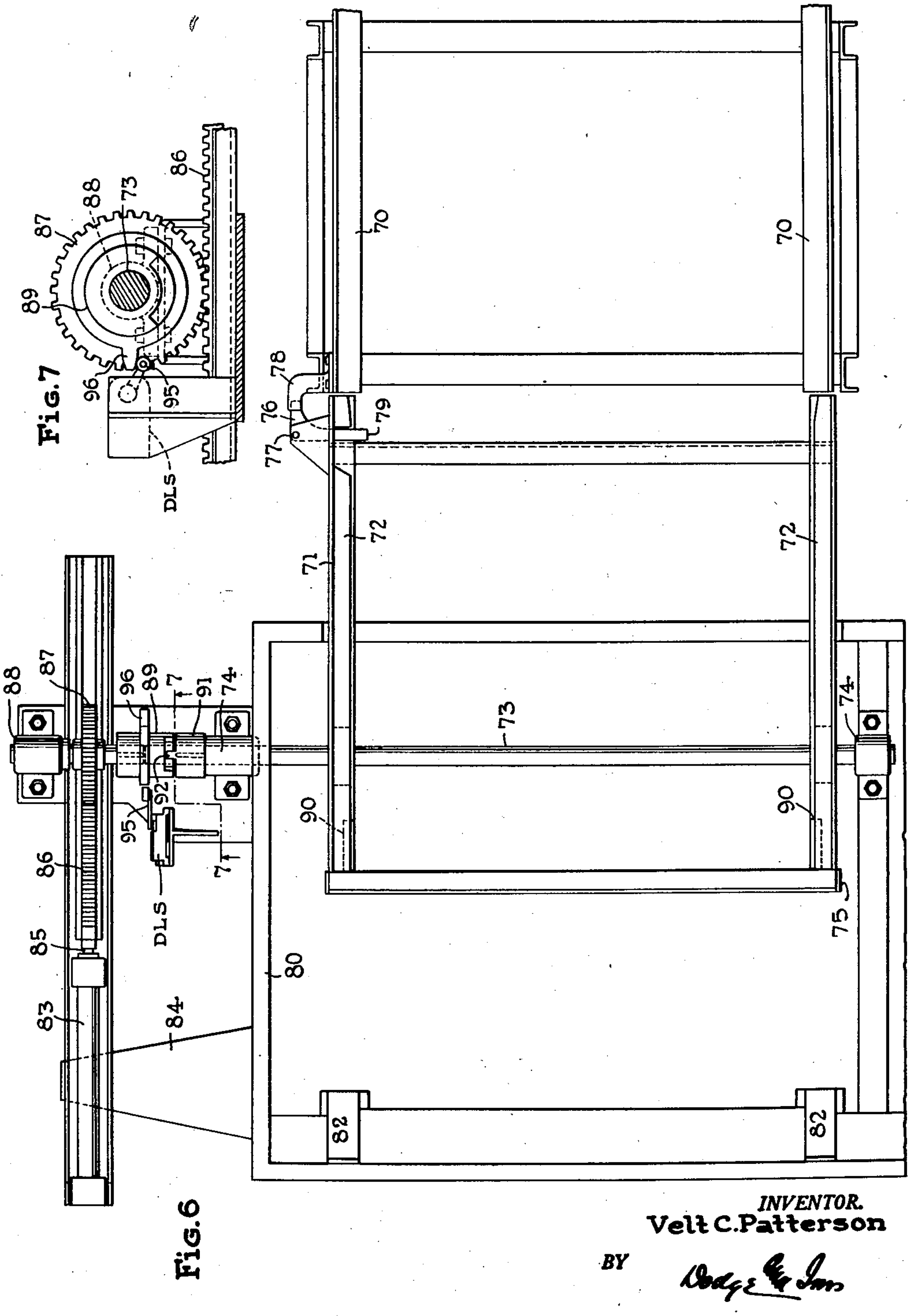
Fig. 6 is a plan view of the tray dump in tray receiving position before a tray has been fed to the dump. A portion of the tray discharge guides is included in this figure.
Fig. 7 is a section on line 7—7 of Fig. 6 showing how the tray dump limit switch is actuated.
Figures 8, 9, 10, 11, 12, 13, 14:
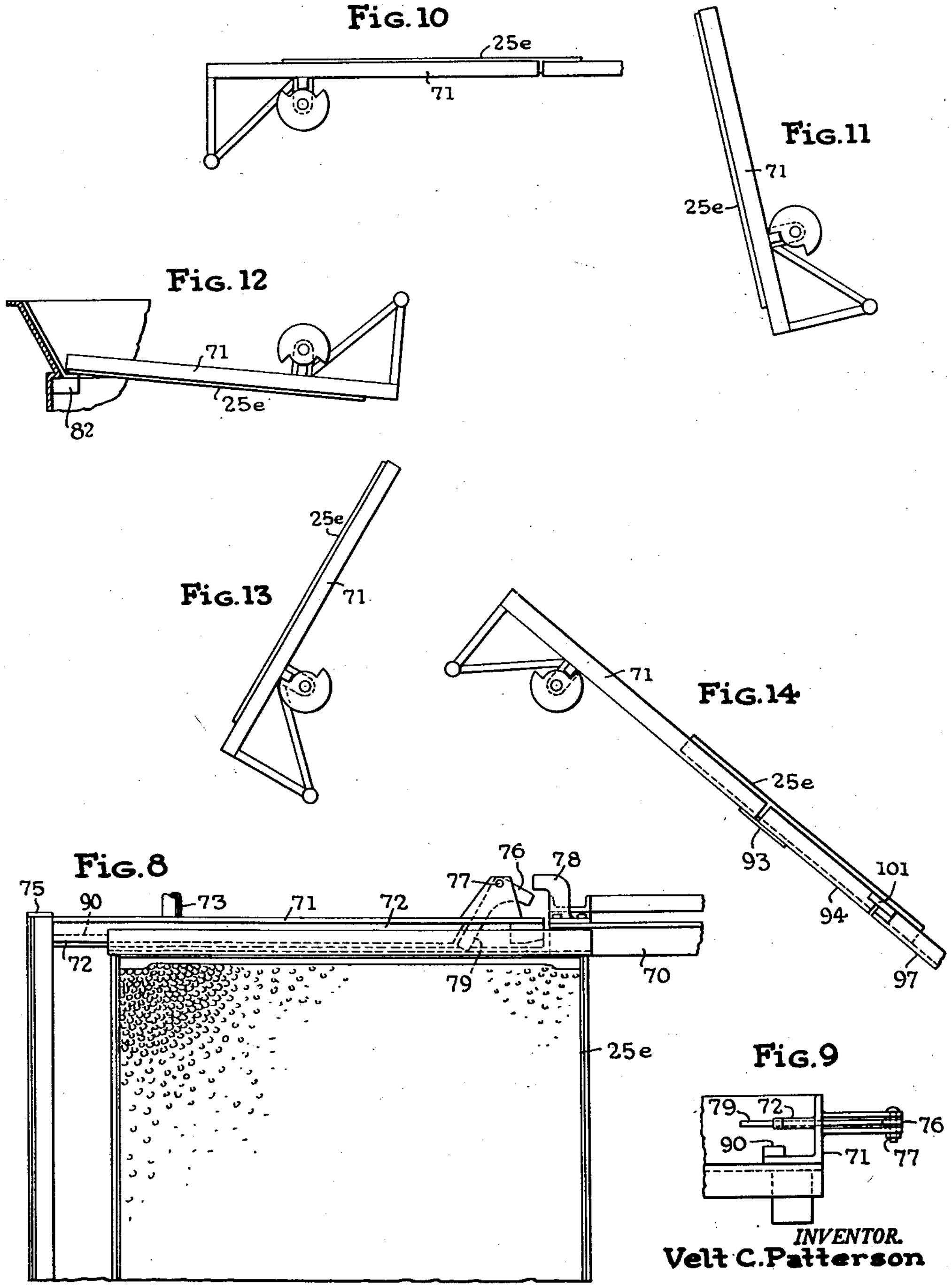
Fig. 8 is a fragmentary view similar to a portion of Fig. 6 but showing the dump-latch released by a tray which has been fed to the dump. This is the condition at the start of the dumping cycle.
Fig. 9 is a fragmentary view of the latch, looking to the left relative to Figs. 6 and 8 and showing the latch in the (engaging) position of Fig. 6.
Figs. 10–14 are diagrams of the dump leaf showing positions respectively as follows.

As the top tray is forced off the stack it moves onto a trackway 70 and pushes ahead of it a series of trays (In the example illustrated there are two such trays). The leading tray of the series of discharging trays is pushed endwise into engagement with the dumping leaf 71, rectangular in form, and shown in considerable detail in Figs. 6, 7 and 8. In Fig. 6 the leaf and guides are shown without trays in place. In Fig. 8 the leading tray is shown forced into engagement with the leaf.

The leaf 71 has overhanging flanges 72 beneath which the lower flange of the channel sides 26 of the tray engage. The leaf is fixed to a rotary shaft 73 which turns in bearings 74. The leaf is provided with a counter-weight 75 so located that when the leaf is horizontal as shown, for example in Fig. 4, the leaf is biased by gravity to turn counterclockwise as viewed in Fig. 4. This bias makes it necessary to retain the leaf 72 in horizontal tray receiving position. This function is performed by a latch 76 pivoted at 77 on a bracket attached to the leaf. The latch 76 engages a keeper 78 fixed to the trackway 70. The latch 76 has a tail 79 which extends into the path of the entering tray so that when a tray has fairly entered beneath the flanges 72 on the leaf the latch is disengaged. At such time, however, the tray itself holds the leaf in alignment with the trackway. The motion of the piston rod 65 is so limited that when it advances full stroke it moves the leading tray 25e (see Fig. 8) to a position such that it has not cleared the trackway 70 but rests thereon for a short distance at its trailing end. Under these circumstances the latch is disengaged and the tray is sustained partly by the leaf and partly by the trackway. That is the condition diagrammed in Fig. 10. To prevent an entering tray from coasting further shallow stop bosses 90 are provided on the leaf.

The bearings 74 which carry the leaf shaft 73 are mounted at opposite sides of a discharge hopper 80. This has a discharge opening indicated at 81. Means are provided to rotate the leaf 71 counterclockwise (as viewed in Figs. 1 and 4) and then permit it to fall to a jarring stop against lugs 82 carried by the hopper 80. The effect is to jar loose frozen materials adhering to the tray. The function of so turning the leaf 71 is performed by a third double acting cylinder motor 83 which is mounted on a bracket 84 and has a piston rod 85 carrying a rack 86. This rack engages a gear 87 which is supported concentrically with the leaf shaft 73, partly by means of a bearing 88, and partly by means of a hub 89 which is journalled on the end of the shaft 73. A second hub 91 fixed on the shaft 73 has a lost motion connection with the hub 89. This is formed by a lug 92 which has about 90° of lost motion in the arcuate recess in the hub 89. The parts are so arranged that if the piston rod 85 is projected outward from the cylinder 83 it turns the gear 87 counterclockwise. Conversely, when the piston rod 85 is withdrawn into the cylinder the gear 87 is turned clockwise.

The operation can now be traced by reference to Figs. 10 to 14, inclusive. When the leading tray enters the leaf it assumes the position shown in Fig. 10. Shortly thereafter the hydraulic motor 83 starts to turn gear 87 and the hub 89 counterclockwise. At the limit of lost motion it starts to rotate the leaf counterclockwise. Shortly after the leaf reaches a vertical position the tray slips off lugs 90 and slides all the way in. Shortly after the tray passes the position of Fig. 11 the tray and leaf overbalance and fall to a jarring stop against the lugs 82 (see Fig. 12). After the impact the leaf and tray freed of the load of frozen material swing upward through a small angle toward the position of Fig. 11. By this time the motor 83 will have reversed and the gear 87 will have started to turn clockwise. After taking up the lost motion it turns the leaf and tray past vertical position. When they reach approximately the position shown in Fig. 13 they overbalance and swing clockwise by gravity until the leaf strikes the stop 93 on the end of a discharge slide 94. In this position the empty tray slides out by gravity and moves across the slide 94.

When the tray moves onto the slide 94 it frees the leaf and also the latch 76. Thus, the latch 76 is moved by gravity to engaging position before the leaf 77 swings counterclockwise as it does when relieved of the weight of the empty tray. The leaf swings counterclockwise until the latch 76 engages the keeper 78, thus putting the leaf in position to receive the next full tray.

To stop and reverse the motor 83 use is made of a normally open dump limit switch DLS whose arm 95 is actuated by a finger 96 fixed on the hub 89. This finger, it will be remembered, turns with gear 87. Fig. 7 shows the parts in switch closing position attained when the piston rod 85 has reached its limit of outward movement.

The slide 94 delivers the tray to a tilting reversing platform 97 hinged on a horizontal axis at 98 and counterweighted at 99 so that the platform 97 will swing up to its tray receiving position shown in Fig. 4 when empty and will sink into alignment with the chute 52 when loaded with an empty tray. The upper position of the platform 97 is determined by a stop 101 and the lower position is determined by a stop 102 on the upper end of the chute 52.

When the leaf 71 drops to the position shown in Fig. 14 the tray slides by gravity across the guide 94 and on to the reversing tilting platform 97. As soon as the tray is fully on the platform the latter sinks to its lower position and the tray slides off the tilting platform onto the chute 52 which returns it to its starting position on the trackway 51.

The tray is heavy and it is desirable to control its sliding movements. To resist premature sliding from the leaf 71 a pair of bow retainers 103 are mounted as shown on a part of the structure which holds the trackways 51 and 69. The retard the sliding movement of the trays a pair of leaf spring brakes 104 are mounted above the slide 94 so as to bear upon the side channels of a passing tray and are adjustable as to their braking action by the set screws 105. To arrest the tray when it is fully on the tilting reversing platform 97 this platform carries two hydraulic shock absorbers 106, one at each side. These are of the type used in automobile suspensions. The arms of these two shock absorbers carry a buffer bar 107 against which the leading end of the tray strikes. The shock absorbers bring the tray to rest without undue shock and suppress any tendency to rebound. Tension springs 108 are used to restore the shock absorbers after the tray has moved off the platform 97.

To assist in bringing the tilting platform 97 to a smooth stop at each limit of motion there is provided a single hydraulic shock absorber 109 whose arm is connected to a rod 111. This rod carries near its opposite ends two stops 112 and 113. The rod is guided in a guide-way formed in the right hand end of the platform 97. As the platform 97 swings up and approaches the position shown in Fig. 4 it engages the stop 113 and moves the arm of the shock absorber 109 downward. As the platform 97 swings down to its lower position, and shortly before the lower position is reached, it strikes the stop 112 and moves the arm of shock absorber 109 upward. Since the hydraulic shock absorber develops resistance to motion in both directions, this single shock absorber cushions arrest of the platform 97 at each limit of its motion.

Bow guards 114 are provided to resist premature discharge of the tray as the platform 97 sinks. The lower ends of the guards act as spring brakes on the sides of the trays and so exercise a restraining braking action as each tray starts to slide off the platform 97. The guards also ensure that the tray is delivered to the chute 52.

To prevent the tray from striking the yoke 63 of the injector plunger with undue force there are provided, at each side of the chute 52, a regulatable brake mechanism each comprising a shoe 115 hingedly mounted on the end of the swinging arm of hydraulic shock absorber 116. The shoe 115 is rounded at its ends and is so limited in its downward motion that successive trays will enter beneath the shoe and force the shoe up. The shoe is drawn downward by a loading spring 117 whose tension is adjusted by turning a hand-wheel 118. By properly adjusting the set screw 105 and the hand-wheel 118 it is possible to assure certain and smooth return of the empty trays from the dumping leaf to the starting position on the trackway 51.

The structure which carries the trackways, hopper, tray-dump, tilting platform and chutes is conventional and is adequately illustrated in Figs. 1 and 4.

The tower, in which the trays are advanced upward, is enclosed in a thermally insulated chamber 119 provided with apertures through which the trackways 51 and 69 pass. Air leakage through these apertures is minimized by the use of flap valves 121 and 122.

At least the low side of a suitable refrigerating system is enclosed in the housing 119. In the drawing this is typified by a refrigerative evaporator 123 mounted in a duct 124 which leads to the upper half of the stack of trays in the tower. A centrifugal fan 125 draws air in through its eye 126 and discharges into duct 124 in which it is refrigerated to temperatures of the order of minus 30 degrees Fahrenheit. Air discharging from duct 124 flows longitudinally through the inter-tray passages in the upper half of the stack. is collected by duct 127 and returned through the inter-tray passages in the lower half of the stack, and flows within the enclosure 119 back to the eye of fan 125.

As best shown in Figs. 2 and 3 the channel iron tray sides 26 close the side of the stack, and the flanges 42 lap the ends of these channel irons. Hence air discharging from duct 124 must flow through the inter-tray passages of the stack. Although the lift cylinder 44 and ejector cylinder 66 are within the housing 119 they are outside the colder part of the air circuit. Furthermore the tray which enters beneath the stack and the tray which is forced off the top of the stack are respectively below and above the forced air circuit. This is assured by the design and location of ducts 124 and 127, as clearly indicated in Fig. 1.

In Fig. 3 is shown an arrangement described and claimed in my application Serial No. 650,421, filed February 27, 1946, now Patent 2,435,462, dated February 3, 1948, and used to assure that any trays which freeze together while in the tower are freed as they rise to the discharge station at the top of the stack. It comprises inclined lugs 128 on the two columns 41 at the left in Fig. 3, and appropriate complementary reliefs 129 cut in the flanges of the opposite pair of columns. The effect is to offset the trays laterally to the right and shear any frozen bond between trays just before they move into the path of the tray ejector.

While freezing together of trays does not occur ordinarily, it sometimes results from using wet trays or as the result of shut-downs, particularly any which involve suspension of refrigeration. The offset guides impose the tray-freeing function on the lift motor, which without increase in size develops ample power for this duty. Thus the ejector motor 66 need not be wastefully designed to develop the relatively large force occasionally required to free a frozen tray.

Since the hydraulic units, diagrammed in perspective in Fig. 2 are all standard units which can be bought in the open market, no novelty is claimed as to the construction of the units themselves. It will therefore be sufficient to describe generally the function and arrangement of the units. The hydraulic fluid will be referred to as "oil."

A base 131 contains a sump or low pressure reservoir for oil. A pump 132 and its driving motor 133 are mounted on the base. A pressure control 134 of any preferred type is provided. High pressure oil lines are designated by 135, and are fed by the pump. The low pressure lines 136 return oil to the sump.

There are three admission and exhaust valves, V1 which controls the injector motor 55 and ejector motor 66, V2 which controls the dump motor 83, and V3 which controls the lift 44. From each valve there are two tubular connections as shown in Fig. 22, one to the head end and the other to the rod end of the motor (or motors) which it controls. The valve simply functions to put one of these connections under pressure from line 135 and vent the other to the low pressure line 136.

The valves V1, V2 and V3 are respectively piloted by solenoids S1, S2 and S3. The functions can be summarized as follows:

If S1 is energized the injector rod 54 and ejector rod 65 move out full stroke, while upon de-energization of S1 they retreat full stroke.

If S2 is energized the rod 85 of the dump motor moves out turning gear 87 in a dumping direction. Deenergization of S2 produces reverse motions.

If S3 is energized the lift 44 rises. If S3 is deenergized it lowers.

The hydraulic system arranged to function as outlined above, is normally subjected to an electrically interlocked timed control system diagrammed in Fig. 23. The essential elements are a timed switch, three multiple contact relays, all of the same type, and the four limit switches already described. There is desirably also a selector switch which can be set to cut out the timed control and subject each solenoid to control by a manual switch.

In Fig. 23 the line connection is at L and the grounded line at G. The three relays are similar and are designated R1, R2 and R3. T represents an electric clock which according to a selected time cycle moves the contactor K to the contact marked "on" and then to the contact marked "off."

The relays are of the multiple contactor type connected as diagrammed. Each moves up if the circuit is closed through its windings between the terminals $x$ and $y$. Rise of the relay breaks the circuit through the winding. The relay will thereafter move down if the circuit is closed between the terminals $y$ and $z$ and will thereafter remain down. Descent of the relay breaks the circuit through the winding. Telltale lights designated as L1, L2 and L3 are used to indicate the condition of solenoids S1, S2 and S3, respectively.

Assume that the selector switch H is closed downward and that the clock is operating. At the start of the cycle S1, S2, and S3 are deenergized, so the tray pushers are retracted, the lift is down and the dump is inert with the left 71 ready to receive a tray. All relays are down. All limit switches are open except ELS which is held closed.

(1) The clock moves K to "on." In consequence R1 lifts and energizes S1. Both tray pushers act full stroke and the injector pusher closes ILS.

(2) The clock moves K to "off." If ILS is closed (and not otherwise) R2 lifts and causes R1 to drop so that pushers retreat. The ejector pusher closes ELS when it has fully retreated.

(3) Closure of ELS with R2 up energizes S2 and the dump motor 83 operates in its first phase. At its limit of motion it closes DLS.

(4) Closure of DLS causes R3 to lift and this causes R2 to drop. This shift of R2 deenergizes S2 and the dump swings back discharging the empty tray. The rise of R3 energizes S3 and the lift rises.

(5) Rise of the lift then closes LLS so that R3 drops and deenergizes S3 and the lift lowers.

This restores the initial positions and marks the end of the cycle. After a selected interval the clock T initiates the next cycle.

If the selector switch H is closed upward to manual position the switches M1, M2, M3 may be used to energize S1, S2 or S3 and so cause the tray pushers, tray dump or lift to operate. However, ELS must be closed (i. e., the tray pushers must have been retracted) or S1 and S2 cannot be energized.

The interlocking relay system above described is one satisfactory type which can be arranged by the use of conventional relays and time clocks. Others can readily be devised, and the details of the electrical system are not claimed as features of novelty.

It will be observed that the only electrical apparatus located in the refrigerated compartment comprises the lift limit switch LLS and the ejector limit switch ELS. By using switches of the enclosed type, difficulties incident to frosting are readily avoided.

It is also to be noted that the hydraulic lift and the ejector motor 66 are out of the circuit of refrigerated air, though within the refrigerated chamber. The oil used in the hydraulic system, and consequently that used in these components is such as to maintain its fluidity at the temperature of the refrigerated chamber.

In freezing food in packages, the preferred practice is to substitute trays of the type shown in Figs. 18, 19 and 20, either with or without the filler plates 37 as the size of the package requires. When such trays are used the finger 96 is readjusted to close limit switch DLS before the lost motion of lug 92 is taken up. This allows the relay sequence to proceed without actuation of the dump. The charging box 62 and plow 63 are removed. The trays are filled by hand at or about the station formerly occupied by the box 62. The trays are unloaded by hand as they pass along the track 70.

After a tray has reached the position of the tray 25e in Fig. 10, and has been completely unloaded, it is pushed by hand all the way onto the leaf 71. The leaf then sinks to the position of Fig. 14, discharges the tray and returns to the position of Fig. 10 automatically.

Interchange of one type of tray for another is a simple procedure. As the trays arrive on the track 51, trays whose use is being discontinued are removed one by one, and each is replaced by a tray of the other type.

Packages can be frozen by merely laying them in the trays of the type shown in Fig. 17. The packages should be wholly below the top of the side members 26, and if they are materially higher than the end members 27, they should be set in spaced rows so as to afford passages for the refrigerated air.

It is occasionally desired to freeze relatively large articles, such as wrapped poultry. For this purpose the procedure indicated in Fig. 21 may be adopted. Here every alternate tray is inverted. This permits the articles frozen to be of a height slightly less than three times the height of the end members 27. The articles should be laid in spaced longitudinal rows to permit adequate flow of air. The possibility of using alternate inverted trays arises from the fact that the side members of the tray are symmetrical with reference to a horizontal plane.

When alternate trays are inverted only half the total number of trays are loaded. This is a desirable condition because the larger objects individually require more intense refrigeration to freeze them in a given time. Since only half the trays are loaded and none is filled, the total amount of material being frozen at a given time and consequently the total refrigerative load are each only about half that contemplated by the design of the machine. As a result of this reduced heat load the machine can be operated on a reasonable time cycle and still freeze the larger articles.

An important characteristic of the machine is that the trays are advanced in a stack and are not handled while under refrigeration by a moving conveyor. At the low temperatures required, conveyor chains and sprockets would be difficult to lubricate, and frost accumulations would result in serious difficulties. With stacked trays the trays scrape the tower free of frost and there are no moving parts in the path of refrigerated air except the trays and their contents.

Another advantage of stacked trays is that the weight of the stack can be used to hold packages flat during freezing. This refers to the practice when trays such as those shown in Fig. 18 are used. Another very important aspect of the invention is that the trays pass in series before the operator so that they are subject to repeated inspection for cleanliness. It is work of a moment to remove a tray and replace it with a similar one. Thus sanitation is easily maintained.

Ability to operate the machine under manual control is important in connection with starting up after stoppages and in any case where it is necessary to check the operation of any component.

Automatic charging and automatic dumping are desirable from a sanitary standpoint, but are even more important from the standpoint of reduction of labor costs. These costs have heretofore been a serious limiting factor in the development of the frozen food industry.

Assuming a continuous supply of prepared material and excluding the operation of packaging the finished product, a plant of the type illustrated in Fig. 1 having a capacity of two tons of material per hour can be operated by one man. The device also saves space as compared to the horizontal tunnel or horizontal belt systems heretofore used.

While the preferred embodiment of the invention has been described in considerable detail this embodiment is intended to be illustrative of the invention, and limitations to the specific structure, beyond those expressed in the claims, are not implied.

What is claimed is:

1. In a device for freezing commodities, the combination of a plurality of vertical guides adapted to confine a stack of trays against lateral displacement, said guides being formed to afford spaces for the insertion and removal of trays respectively beneath the bottom and from the top of the stack; a plurality of trays adapted to be raised step by step in a stack while confined by said guides, said trays being so formed that when stacked they afford for each tray a flow path approximately coextensive with the horizontal area of the tray and extending through the stack; latching means for engaging the lowermost stacked tray to prevent downward motion of the stack; conveyor means for delivering trays successively beneath said stack and for removing trays successively from the top of the stack; a platform reciprocable to engage an inserted tray, raise it and the stack until the inserted tray is engaged by said latching means and then retreat to permit the insertion of the next tray, said platform forming a closure coextensive with the horizontal area of the trays; a refrigerative cooler; fan means for propelling air in heat exchanging relation with said cooler; means for guiding the propelled refrigerated air in confined streams which traverse said tray-defined flow paths throughout substantially the entire height of the stack, said guiding means including said platform and a housing associated with said guides; and a fluid pressure motor for reciprocating said platform, said motor being located beneath said platform so as to be protected thereby from the refrigerated air stream.

2. The combination defined in claim 1 in which both conveyor means are of the pusher type, and comprise tray pushers and fluid pressure motors connected to actuate said pushers, said motors being located externally of and protected from contact with said stream of refrigerated air.

3. The combination of a guiding tower, a plurality of trays adapted to be lifted step by step in a stack through said tower, said trays each having relatively deep sides formed of channel-iron arranged with the flanges projecting outward, and said tower including means which lap the ends of the channel-iron sides of the trays except at the top and bottom of the stack, whereby circulation of air through the space between the flanges of the channel-iron is precluded; latches mounted near the bottom of the tower and adapted to engage the sides of the lowermost tray in the stack and sustain the stack against downward motion; means for inserting trays serially beneath the stack; means for pushing trays serially from the top of the stack; means for circulating refrigerated air transversely through the stacked trays from end to end of the trays; and a reciprocating lift mounted at the base of the tower beneath the stack, said lift being adapted to engage the inserted tray and lift it and the stack until the latches engage the inserted tray, and then retreat to receive the next inserted tray.

4. The combination of a guiding tower; a plurality of trays adapted to be lifted step-by-step in a stack through said tower, said trays having a flat bottom extending over the entire horizontally projected area of the tray and a false bottom spaced thereabove to form an air passage, the space above the false bottom being dimensioned so that packages placed therein will be held flat by the bottom of the superposed tray; latch engaging means on each tray; latches mounted near the bottom of the tower and adapted to coact with said latch engaging means of the lowermost tray in the stack; means for inserting trays serially beneath the stack; means for pushing trays serially off the top of the stack; means for circulating refrigerated air through the air passages in the stacked trays; and a reciprocating lift at the base of the tower beneath the stack, said lift being adapted to engage the inserted tray and lift it and the stack until the latches engage its latch-engaging means, and then retreat to receive the next tray.

5. The combination of a guiding tower; a plurality of trays adapted to be advanced step by step through said tower in a stack, said trays having latch keepers symmetrical with reference to the horizontal medial plane of the tray and being so formed as to afford for each tray at least one passage extending through the stack from side to side thereof; conveyor means operable to insert trays beneath the stack and to remove trays from the top of the stack, said means being indifferent to whether the tray is right side up, or inverted; reciprocating means for lifting the inserted tray and the stack at least one tray interval; latches for engaging said keepers and serving to sustain the inserted trays and stack and prevent downward motion thereof after they are so lifted; and means for circulating air at subfreezing temperature through said stack by way of said passages and throughout the height of the stack, the parts being so arranged that the device is operable to feed through the stack in alternation filled trays and empty inverted trays.

6. Means for freezing flat packages of uniform thickness while preventing distortion thereof; comprising a stack of superposed trays having inter-tray spaces so dimensioned relatively to the thickness of the packages that the weight of the stack confines the packages in said spaces and engagement of the trays determines their relative positions, the trays being so formed as to afford air passages through the stack and to cause each tray to present a flat bottom surface to the underlying packages and to the marginal portion of the underlying tray; means for circulating refrigerated air through said passages; and means adapted to function periodically to add a loaded tray to one end of the stack, remove a tray from the other end of the stack and advance the stack one tray thickness toward the last-named end.

7. The combination defined in claim 6 in which a tower encloses the stack of trays, the air-circulating means communicates with the air passages in the trays through the sides of the tower, and the tray removing means and the stack advancing means are located out of the path of circulated air.

8. The combination of a plurality of trays each having load sustaining sides, the trays being so formed as to afford at least one air passage per tray in the direction of the length of a tray when a plurality of trays are stacked; a treatment tower adapted to guide stacked trays; reciprocating lift means serving to pass trays in stacked relation through said tower; means for directing air at sub-freezing temperature transversely through said tower by way of said passages; loading and unloading pusher motors for inserting successive trays at one end of the stack and removing successive trays from the other end; and timing means comprising electrically actuated valves and serially acting valve controlling switches serving to cause operation of the lift means and of the pusher motors in alternation whereby insertion and removal of trays take place between stack advancing cycles of the lift means.

9. The combination of a plurality of trays each having load sustaining sides, a substantially flat bottom and a package receiving tray-like top spaced above said bottom to afford an intervening air passage; a treatment tower adapted to guide stacked trays; reciprocating lift means serving to pass trays in stacked relation upward through said tower; means for directing air at sub-freezing temperature transversely through said tower by way of said passages; loading and unloading pusher motors for inserting successive trays at the lower end of the stack and pushing successive trays so that they slide from the other end; and timing means comprising electrically actuated valves and serially acting valve-controlling switches serving to cause operation of the lift means and of the motors in alternation whereby insertion and removal of trays take place between stack advancing cycles of the lift means.

10. The combination of a plurality of trays having upstanding load sustaining sides, and ends which are lower than said sides; a treatment tower adapted to guide trays while in stacked relation; reciprocating lift means for passing trays while in stacked relation vertically upward through said treatment tower; means for directing air at sub-freezing temperatures transversely through the tower, said air passing in the direction of the lengths of the trays whereby the air passes above and below successive trays by flowing over the low ends of the lower tray of each two contacting trays; a loading pusher motor adapted to advance trays in horizontal series endwise beneath a loading hopper and deliver the leading tray of the series to the lower end of the stack; means to level the material delivered to trays by the hopper and limit its depth substantially to the depths of the tray ends; an unloading pusher motor arranged to slide trays from the upper end of the stack; and timing means serving to cause operation of the lift means and of the two pusher motors in alternation whereby the insertion and removal of trays take place between the stack advancing cycles of the lift means.

11. The combination of a plurality of trays each having load sustaining sides and so formed as to afford at least one air passage per tray in the direction of the length of the trays when a plurality of trays are stacked, said trays being symmetrical, whereby alternate trays may be fed while in inverted position to serve as spacers and thus increase the inter-tray article-receiving space; a treatment tower adapted to guide stacked trays; reciprocating means serving to pass trays in stacked relation through said tower; means for directing treating air transversely through said tower by way of said passages; and means for supplying trays serially to one end of the stack and removing trays serially from the other.

12. A device for freezing materials in bulk in trays and dumping the trays, comprising in combination, an enclosure in which air at sub-freezing temperatures is circulated; means for feeding loaded trays through said enclosure; a discharge guide for receiving trays serially ejected from said enclosure; a power operated ejector adapted to move trays serially from said enclosure a definite distance onto said guide; a hinged dumping leaf adapted to receive and confine a tray, and capable of swinging from a tray-receiving position in alinement with said guide both upward and over to a tray-inverting dumping position, and downward to a tray-discharging position in which the tray will slide by gravity from the leaf; biasing means for returning the unloaded leaf to tray-receiving position from tray discharging position; a latch adapted to arrest the leaf in tray-receiving position and to be held released by a tray engaged by the leaf, the leaf being so located relatively to the position to which trays are advanced by the ejector that an entering tray stops short of full entry sufficiently to remain supported by the guide; a reversible motor having a normal position; lost-motion connections through which the motor when operated in one direction swings the leaf upward until it over-balances and falls to a tray-jarring discharge position, and then when reversed swings the leaf back until it over-balances and falls past tray-receiving to tray-discharging position; means for receiving the discharged tray; and control means arranged to operate the ejector and then operate the motor in the first named direction then reverse the motor, and finally stop the motor when it has returned to its normal position.

13. The combination with the structure of claim 12, in which the means for receiving the discharged tray is an inclined tray guide, of a power actuated injector conveyor, having a track for guiding trays from a tray-receiving station to the means which feeds the trays through the enclosure; tray charging means adapted to feed material to be frozen to trays as they pass along said track; and gravity transfer means for delivering trays from said inclined tray guide to said tray-receiving station.

14. The combination with the structure of claim 12, in which the means for receiving the discharged tray is an inclined tray guide, of a power actuated injector conveyor, having a track for guiding trays from a tray-receiving station to the means which feeds the trays through the enclosure; tray charging means adapted to feed material to be frozen to trays as they pass along said track; and gravity transfer means for delivering trays from said inclined tray guide to said tray-receiving station, including a tilting platform biased to aline with said inclined tray guide and to be depressed by the weight of a tray received therefrom, hydraulic shock absorbing means adapted to arrest a tray received by said platform and hydraulic shock absorbing means serving to arrest said tilting platform at both limits of its tilting motion.

VELT C. PATTERSON.

REFERENCES CITED

The following references are of record in the file of this patent:

UNITED STATES PATENTS

| Number | Name | Date |
|---|---|---|
| 325,360 | Rogers et al. | Sept. 1, 1885 |
| 999,164 | Harter et al. | July 25, 1911 |
| 1,053,033 | Haupt | Feb. 11, 1913 |
| 1,422,816 | Beers et al. | July 18, 1922 |
| 1,561,664 | Rathwell | Nov. 17, 1925 |
| 1,805,029 | Baker | May 12, 1931 |
| 1,846,258 | Johnson et al. | Feb. 23, 1932 |
| 1,958,890 | Foss | May 15, 1934 |
| 1,977,008 | Neher | Oct. 16, 1934 |
| 2,257,377 | Haben | Sept. 30, 1941 |
| 2,344,664 | Adams | Mar. 21, 1944 |
| 2,415,677 | Earp | Feb. 11, 1947 |